United States Patent [19]

Kolm et al.

[11] 4,032,114

[45] June 28, 1977

[54] VORTICAL FLOW DISTRIBUTOR

[75] Inventors: Henry H. Kolm, Wayland; John A. Oberteuffer, Lexington, both of Mass.

[73] Assignee: Sala Magnetics, Inc., Cambridge, Mass.

[22] Filed: June 30, 1976

[21] Appl. No.: 701,426

[52] U.S. Cl. .................................. 259/4 R; 138/38
[51] Int. Cl.² ........................................ B01F 15/00
[58] Field of Search ..................... 259/4 R, 18, 36; 138/38, 42

[56] References Cited
UNITED STATES PATENTS

| | | | |
|---|---|---|---|
| 2,295,088 | 9/1942 | Kleucker | 138/38 |
| 3,045,984 | 7/1962 | Cochran | 259/4 |
| 3,376,023 | 4/1968 | Lage | 138/42 X |

Primary Examiner—Edward J. McCarthy
Attorney, Agent, or Firm—Joseph S. Iandiorio

[57] ABSTRACT

A vortical flow distributor for uniformly, vortically distributing incoming fluid in a plane transverse to the primary flow direction, including an outlet and at least one smaller inlet; a plenum chamber disposed between the inlet and outlet and having an area corresponding to the area of the outlet and having a length in the primary flow direction which is substantially less than its width; and a flow diverter aligned with each inlet for directing the incoming fluid to a plane transverse to the primary flow direction, and establishing a tangential flow with radial components for producing over the plenum chamber area a pattern of distributed vorticity which finally dissipates the flow velocity.

13 Claims, 12 Drawing Figures

VORTICAL FLOW DISTRIBUTOR

FIELD OF INVENTION

This invention relates to a vortical flow distributor for uniformly, vortically distributing incoming fluid in a plane transverse to the primary flow direction.

BACKGROUND OF INVENTION

High gradient magnetic separators are used to separate weakly magnetic materials of very small particle size from a liquid or gaseous suspension medium, or from a mixture of non-magnetic particles carried by a liquid or gaseous medium. High gradient separators are usually based on the use of a matrix of finely divided filamentary ferromagnetic material such as steel wool, woven or felted steel fibers, expanded steel lath, or the like. Such matrices typically have filament sizes comparable to the size of particles being separated, and typically comprise 95% void space even when highly compressed, so that they offer a very considerable surface area and open flow volume. Such matrices cannot be effectively magnetized in the magnetic circuit of conventional separation magnets because the matrices do not conduct magnetic flux and require very strong background fields to magnetize; thus high-performance, iron-bound solenoid magnets are used. These iron-bound solenoid magnets generate strong uniform background fields in a cylindrical volume surrounded by coils carrying high-density electric current: the cylindrical volume is terminated at each end by a massive iron pole plate connected to an external flux return frame which surrounds the coil structure.

In cyclic high gradient magnetic separators, the matrix material is packed into a cylindrical canister which fits into the magnet structure. The material to be separated is fed through this canister by means of one or more inlet and outlet ducts which pass through the massive pole plates. Magnetic particles are retained at the surface of the magnetized matrix filaments if the magnetic trapping forces are greater than the viscous drag forces at the flow velocity. When the matrix is loaded, typically when it has collected about its own weight in magnetic particles, the magnetic field is turned off and the collected magnetic particles are flushed out of the canister, preferably at a flow rate several times higher than the feed rate. The collecting cycle is then repeated.

In continuous high gradient magnetic separators, the matrix material is carried continuously through the magnet structure, for example by means of a compartmented ring or carousel. For this purpose, the iron-bound solenoid has the shape of a circular segment rather than a cylinder. The feed is introduced through ducts in the pole structure as in the cyclic devices, but the magnetic materials are flushed out of the matrix continuously at a point outside the magnet structure. Continuous devices are needed for applications where the magnetics comprise a sizable fraction of the feed, such as in the beneficiation of weakly magnetic, finely divided iron ore. Cyclic devices are more expedient where only a small fraction of the feed is magnetic, such as the purification of clay used in paper coating, or the purification of water.

The feed ducts which pass through the magnet pole plates necessarily have a substantially smaller flow cross section than the matrix canister, the ratio of cross section areas typically ranging from 8 to 24, depending on the particular application in question. Typical flow velocities in the canister range from 1 to 30 cm/sec (2 to 60 ft./min.) Flow velocity is an important process parameter since the viscous drag forces which compete with the magnetic trapping forces on particles increase approximately as the square of flow velocity, and since the maximum permissible flow velocity determines the capacity and thus the operating cost of a machine.

Therefore a uniform flow distribution should be maintained throughout the canister volume. Mal-distribution will not only reduce the performance of a machine, it will also initiate a progressively deteriorating instability. Slurry particles will settle and accumulate in low velocity regions and cause local clogging of the matrix, thereby forcing the flow to concentrate progressively into tunnels of high velocity. In some applications this inherent instability is so severe that local clogging will develop in a matrix even if flow is distributed uniformly at the inlet; it is necessary in such cases to re-distribute the flow at several points along its path through the matrix.

High gradient magnetic separators therefore require flow distributors which are very effective, and which satisfy several other requirements not encountered in other applications Such flow distributors should occupy a minimum of space in the flow direction, because at least one or even several of them must be located inside the very expensive magnetized volume. They must permit flushing velocities several times higher than the feed velocity without causing a prohibitive pressure drop. They must be readily adaptable to a wide range of flow conditions, slurry viscosities, etc. Finally, they must operate without causing stagnation and clogging.

A conventional approach provides a plenum chamber at the canister inlet which receives the slurry input and terminates in a perforated plate or screen covering the entire inlet cross section of the matrix canister. This perforated plate or screen must offer enough flow resistance to dissipate substantially all the kinetic energy or "velocity head" of the incoming fluid and achieve the desired degree of uniformity.

This method of flow distribution by a perforated plate or screen is unsatisfactory for several reasons. Even if the high pressure drop is acceptable during the feed cycle, as is the case in applications involving moderate feed rates, this pressure drop makes it impossible to achieve sufficiently high flushing velocities to effectively purge the matrix. Another serious problem is that the sudden decrease in flow velocity as the slurry enters the plenum induces sedimentation and cumulative clogging.

SUMMARY OF INVENTION

It is therefore an object of this invention to provide an improved vortical flow distributor for uniformly, vortically distributing incoming fluid in a plane transverse to the primary flow direction.

It is a further object of this invention to provide such a vortical flow distributor for uniformly, vortically distributing incoming fluid in a plane transverse to the primary flow direction, which effects the distribution without a decrease in velocity, with uniform pressure, and by dynamic, rather than static, means.

It is a further object of this invention to provide such a vortical flow distributor which is effective for a wider range of flow velocity without prohibitive pressure drops, which is effective with slurries and suspensions that might settle out in conventional devices, and which may be easily adapted to varying materials and flow conditions by simple adjusting means.

It is a further object of this invention to provide such a vortical flow distributor which occupies a minimum of space in the flow direction, which permits back flushing at high velocity, and which prevents stagnation and clogging.

The invention resulted from the realization that in a flow in which inertial effects dominate over viscous effects, the principle of conservation of angular momentum requires that a coherent rotation of circulation imparted to the fluid be spontaneously converted into uniformly distributed local vorticity, which dissipates the flow velocity, and the further realization that this can be achieved by redirecting the incoming fluid into a plane transverse to the primary flow direction and orienting the flow to generate a tangential flow with radial velocity components for producing a pattern of distributed vortices.

The invention features a vortical flow distributor for uniformly, vortically distributing incoming fluid in a plane transverse to the primary flow direction. There is an outlet and at least one smaller inlet with a plenum chamber disposed between the inlet and the outlet. The plenum chamber has an area corresponding to the area of the outlet, and a length in the primary flow direction which is substantially less than its width. A flow diverter aligned with each inlet directs the incoming fluid into a plane transverse to the primary flow direction and establishes a tangential flow with radial components for producing over the chamber area a pattern of distributed vorticity which finally dissipates the flow velocity. The flow diverter may be a single deflector element or member such as a curved surface or an inclined plate which performs both actions or may include two or more members or surfaces.

For example, in a preferred embodiment the flow diverter may include a first deflector device for directing the incoming fluid into a plane transverse to the primary flow direction and a second deflector device for establishing the tangential flow with radial components. The first deflector device may include a first section generally parallel with the plane of the plenum chamber, and a second deflector device which includes a second section inclined toward the associated inlet. The flow diverter may further include a support member mounted at the outlet end of the plenum chamber for mounting the deflector device, and an adjustment mechanism may be provided for settling the orientation of the flow diverter.

Alternatively, the first deflector device may include a plate having a hole in its inner portion proximate the center of the plenum chamber and the second deflector device may include a first pair of curved segments inwardly converging toward the hole and carried by the plate facing the associated inlet. The second deflector device also includes a second pair of curved segments outwardly diverging from the hole and carried by the plate on the side facing the outlet.

Alternatively, the first deflector may include an omnidirectional surface, and the second deflector device may include a helical vane disposed proximate the terminus of the inlet of the plenum chamber.

DISCLOSURE OF PREFERRED EMBODIMENT

Other objects, features and advantages will occur from the following description of a preferred embodiment and the accompanying drawings, in which.

Figure 1:
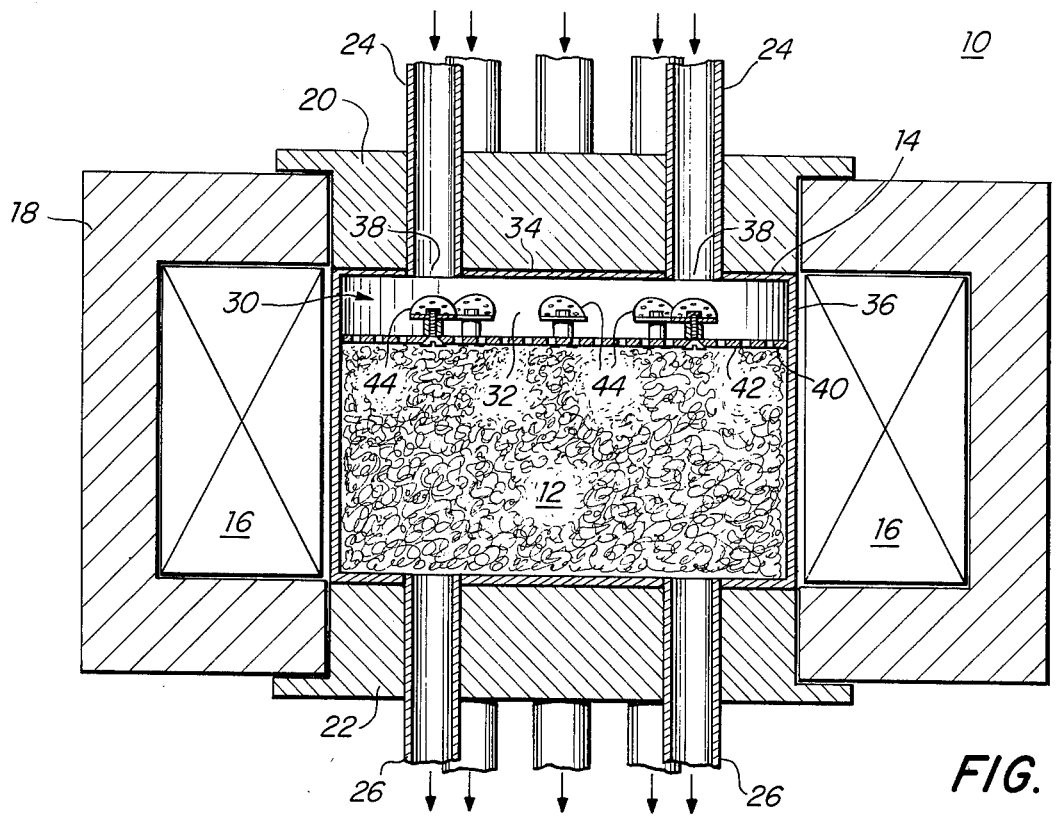
FIG. 1 is a diagrammatic cross-sectional view of a high-intensity magnetic separator using a vortical flow distributor according to this invention.

There is shown in FIG. 1 a typical cyclical high-gradient magnetic separator 10 having a matrix 12 disposed in a canister 14 of non-magnetic material, surrounded by an electromagnetic coil 16 which provides a magnetic field within matrix 12. Coil 16 is surrounded by an iron return frame 18 which is completed by covers 20 and 22 at the top and bottom, respectively, of canister 14. The fluid to be separated is delivered to canister 14 through the input pipes 24 and the products of separation are recovered through output pipes 26.

Vortical flow distributor 30 includes plenum chamber 32, whose top and side wall 36 are defined by the top and side wall of canister 14. The one or more inlets 38 of plenum chamber 32 are constituted by the input pipes 24 of canister 14. The much larger area outlet 40 of plenum chamber 32 is defined by the area at the top of matrix 12, which in this specific embodiment is covered by a grid of rods or wires or a conventional perforated plate 42, which serve to support the flow diverters 44 according to this invention. Plenum chamber 32 is considerably shorter in the direction perpendicular to the primary flow; each flow diverter 44 is located directly beneath an inlet 38.

Figure 2:
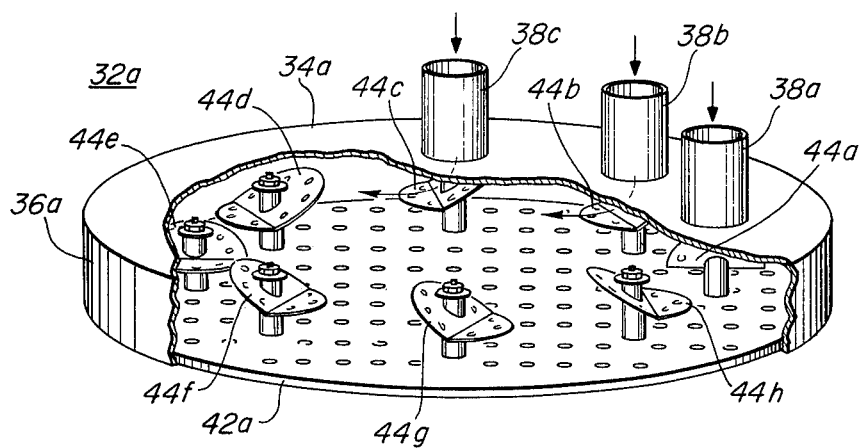
FIG. 2 is an enlarged, partially broken-away axonometric view of a vortical flow distributor utilizing a particular type of flow diverter according to this invention.

The arrangement of flow diverters 44 is more readily observable in FIG. 2, where each flow diverter 44a–h is shown located beneath its associated inlet, 38a, b, c . . . , the remaining inlets having been omitted with the broken-away portion. Plenum chamber 32a, FIG. 2, is shown as an independent structure including a top 34a, side wall 36a, and a perforated bottom 42a.

Figure 3:
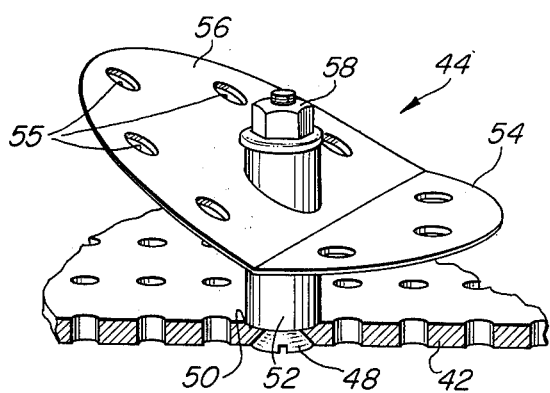
FIG. 3 is an enlarged axonometric view of a portion of the flow distributor of FIG. 2 showing a flow diverter in more detail.

Each flow diverter 44, FIG. 3, is mounted by means of a screw 48 in hole 50 of perforated plate 42, which engages with post 52 and supports a pair of integral deflector devices or members 54 and 56. Deflector member 54 is generally parallel to the plane of the plenum chamber for redirecting incoming fluid into a plane transverse to the primary flow direction. Second deflection member 56 is inclined upwardly toward its associated inlet and is oriented to generate a tangential flow with radial velocity components for producing over the plenum chamber a pattern of distributed vorticity which finally dissipates the flow velocity. Orientation of deflection members 54 and 56 is varied by rotating them about the axis of post 52, and clamping them in the desired position by means of screw 48 and nut 58 located atop post 52. Holes 55 are provided in members 54 and 56 to relieve the vacuum or underpressure which would otherwise be created on the lee side by the Bernouli effect. Such flow diverters are suitable for applications involving low viscosity suspensions and high flow velocities, such as encountered in the removal of ferromagnetic particles from steel-mill process water and scrubber water, in a high-gradient magnetic separator.

Figure 4:
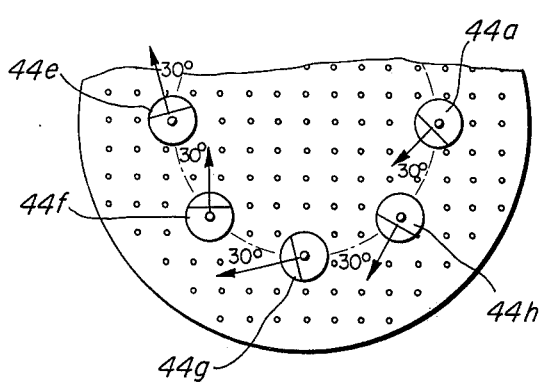
FIG. 4 is a diagrammatic, partial plan view of a flow distributor similar to that shown in FIGS. 1 and 2, indicating the orientation of the flow diverters to produce a desired vorticity pattern.

A typical arrangement pattern for flow diverter 44 is shown in FIG. 4, where flow diverters f, g, h, and a are aimed alternatively inwardly and outwardly at 30° to the tangent to add radial velocity components to the tangential flow.

Although thus far, as shown in FIG. 1, there is but one vortical flow distributor according to this invention used in a high-gradient magnetic separator, this is not a necessary limitation of the invention. More than one such flow distributor may be used in a high-gradient magnetic separator. For example, a second one may be placed midway through the matrix to collect and once again uniformly distribute the flow in the successive portions of the matrix. In addition, the vortical flow distributor of this invention may be used with other devices such as contacters and reactors used in the chemical processing industry, mixers, burners, heat exchangers, extrusion dies, textile spinning chimneys, and many other applications.

Figure 4A:
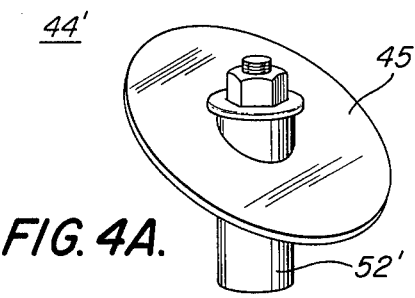
FIG. 4A is a simplified axonometric view of an alternative construction of a flow diverter according to this invention.
Figure 4B:
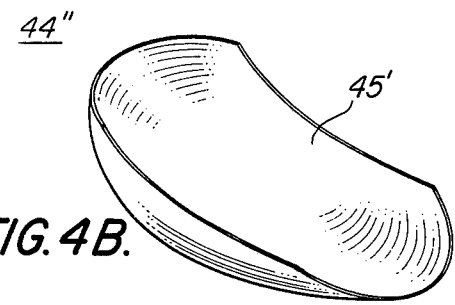
FIG. 4B is a simplified axonometric view of another alternative construction of a flow diverter according to this invention.

Although in the flow distributor of FIGS. 1-4 there are two deflector devices which are distinct but an integral part of a single plate, this is not a necessary limitation of the invention. The flow diverter may include a single deflector member without clearly distinguishable parts, such as flow diverter 44', FIG. 4A, including a single plate 45 which is properly oriented in three dimensions to provide both the redirection of the primary flow and the establishment of the tangential flow with radial components, and support post 52'. Or the flow diverter 44", FIG. 4B, may include a curved surface such as chute 45' which is constructed so that it need only be oriented in two dimensions.

Figure 5:
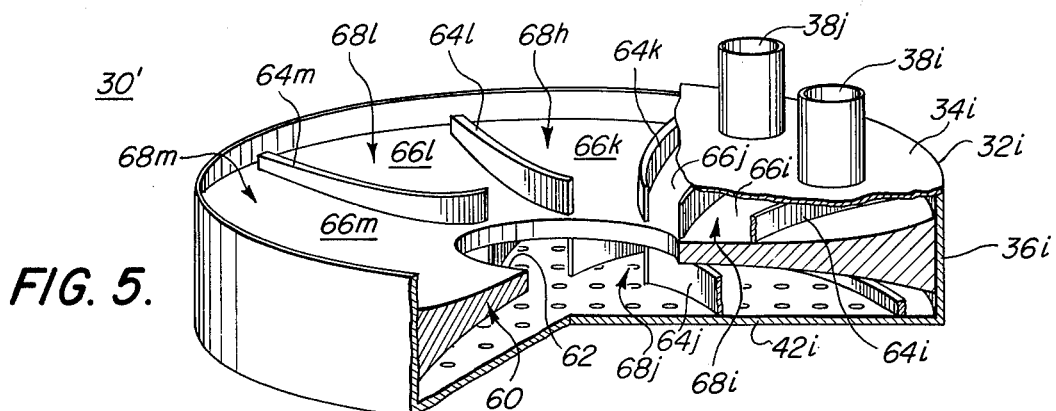
FIG. 5 is an enlarged view of a portion of another flow distributor using a different flow diverter according to this invention.

Alternatively, flow distributor 30', FIG. 5, may include a plenum chamber 32i identical to plenum chamber 32a, FIG. 2, but including a plate 60 located midway in plenum chamber 32i and having a central aperture 62. The plate includes a plurality of curved segments 64i, 64j, 64k, 64l, 64m, which converge inwardly toward hole 62 on the side of plate 60 facing inlets 38.

Figure 6:
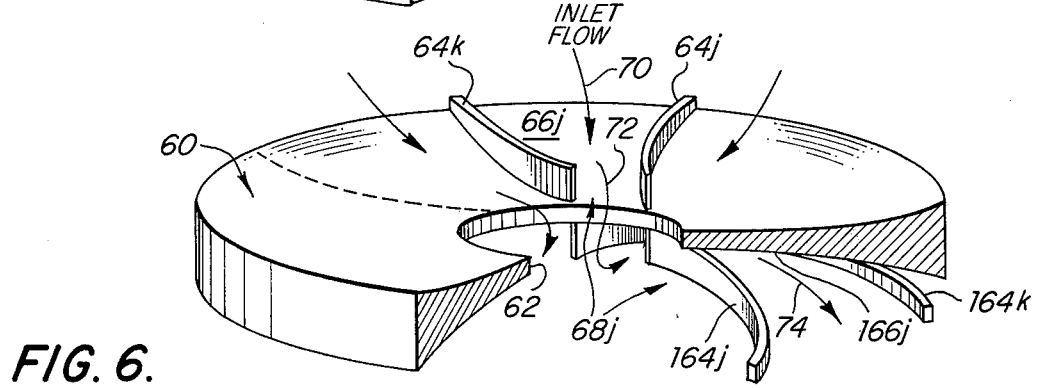
FIG. 6 is an enlarged detailed view of a portion of the flow distributor of FIG. 5 indicating the pattern of flow which it produces.

The combination of each pair of segments, for example 64j and 64k, and the bounded surface 66j of plate 60, with a corresponding pair of segments 164j, 164k, and the bounded surface 166j on the underside of plate 60, FIG. 6, constitute a flow diverter 68j which establishes a pattern of distributed vorticity in the same manner as flow diverters 44 of FIGS. 1-4.

This flow diverter is suitable for applications involving high viscosity suspensions and low velocities, such as the removal of weakly magnetic impurities from clay used in paper coating, in which a maximum amount of rotary motion is required to achieve adequate vorticity to avoid sedimentation. The inlet flow moves downwardly into the upper portion of flow diverter 68j, arrow 70, toward the surface 66j of flow diverter 68j and changes directions, arrow 72, moving toward the center and through hole 62, and then outwardly, arrow 74, in the lower portion of flow diverter 68j, between segments 164j and 164k.

Figure 7:
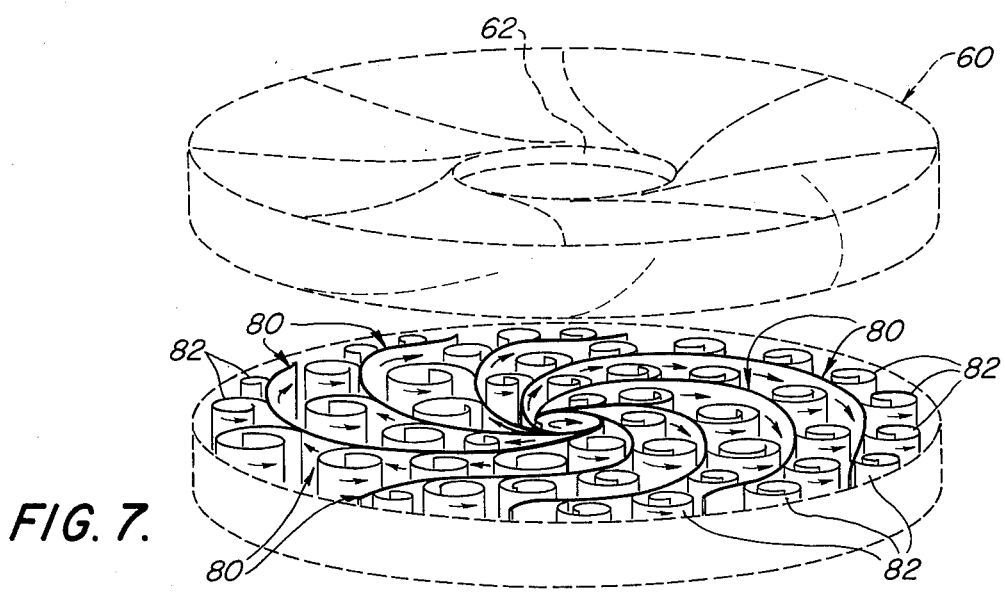
FIG. 7 is a conceptualized schematic diagram of the vorticity pattern produced by the flow distributor of FIGS. 5 and 6.

The resulting vorticity patter is conceptually illustrated in FIG. 7, wherein a plurality of mainstream lines 80 spiral outwardly in a clockwise direction while spontaneously breaking up into smaller vortices 82 of opposite, counterclockwise flow.

The basic principle by which this dynamic flow distribution, or pressure uniformity, is achieved is the conservation of angular momentum in a flow in which inertial effects predominate over viscous effects, i.e. a flow characterized by high Reynolds number. Under such conditions, a coherent rotation or circulation imparted to a fluid is spontaneously converted into uniformly distributed local vorticity before a significant velocity decrease occurs. The local stagnation pressure in this flow is then governed by the overall, large-scale circulation. Expressed in another way, the kinetic energy of the entering fluid is dissipated in uniformly distributed local vortices instead of, for example, being dissipated in uniformly distributed holes in a perforated plate. This eliminates the stagnation or abrupt velocity drop associated with a conventional perforated plate which causes sedimentation of slurry particles.

Operation of this device is controlled by two fundamental theorems of hydrodynamics. The Proudman-Taylor theorem states that in a fluid rotating steadily about a vertical axis, any flow pattern induced at one level is induced at all levels by Coriolis forces. In other words, rotary motion is two-dimensional, meaning that there will be total mixing within fluid rotating in the plenum, and no stratified motion or stagnation.

The Helmholtz theorem of angular momentum conservation states that outward spiralling motion tends to break up into distributed vorticity of opposite sense.

Figure 8:
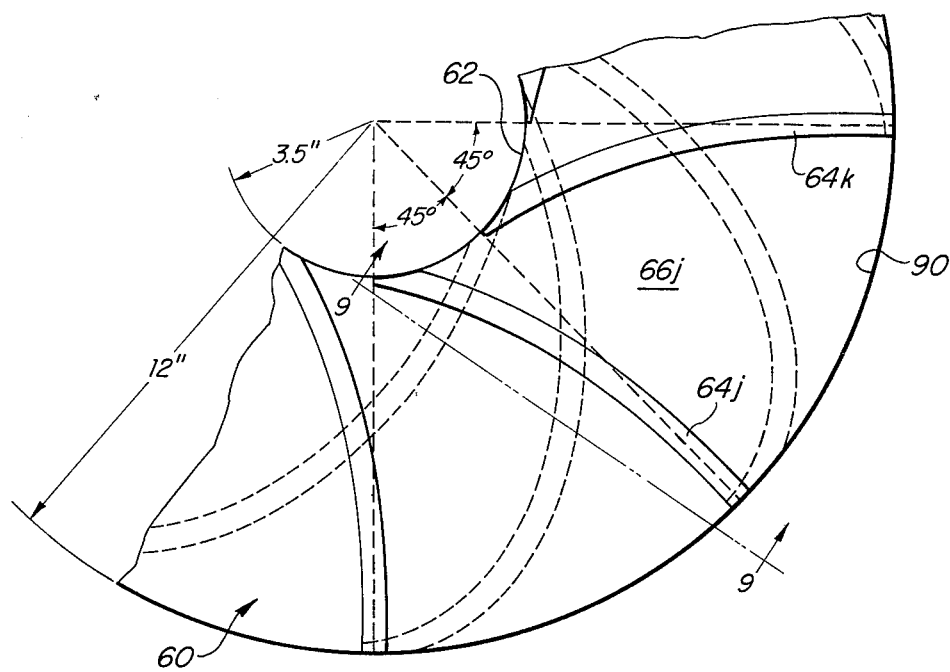
FIG. 8 is a partial plan view of the flow distributors of FIGS. 5 and 6, showing the arrangement of the top and bottom segments.

The specific construction of segments 64 is shown in more detail in FIG. 8, where it is indicated that each segment 64 is radially oriented at its outer extremity and becomes progressively more tangential toward the center, its inner extremity forming an angle of about 45° with respect to the local radius. The flow is thereby accelerated progressively in the clockwise direction, seen from above, as it moves inward. The lower segments 164 are curved so as to receive the spiralling flow as it emerges through the central aperture and further accelerate its clockwise rotation as it moves outward. Lower segments 164 therefore are oriented at about 45° with respect to the local radius at their inner extremities, and their orientation becomes progressively more tangential toward the outside, as shown.

Figure 9:
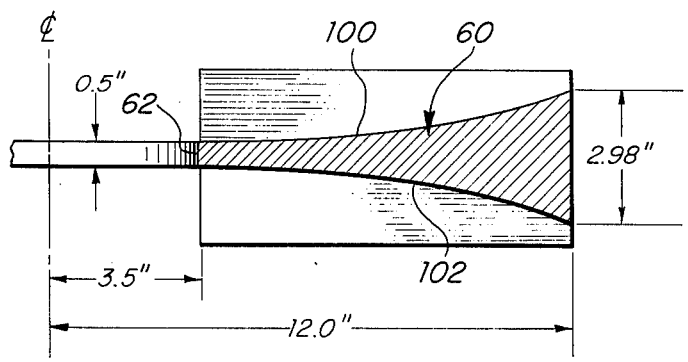
FIG. 9 is a cross-sectional view taken along line 9—9 of FIG. 8, illustrating the variation in thickness of a portion of the flow diverter shown in FIGS. 5 and 6.

In order to keep a fairly constant cross-sectional flow area in the flow diverters 68 where the upper surfaces 66 and lower surfaces 166 increase in width from the center outwardly, plate 60 may be tapered as shown in FIG. 9. For example, with plate 60 having a radius of 12 inches and hole 62 a radius of 3.5 inches, plate 60 may be designed to have a thickness of approximately ½ inch at its inner periphery at the edge of hole 62 and a thickness of 2.98 inches at its outer periphery, with gently curving surfaces 100 and 102 between.

Figure 10:
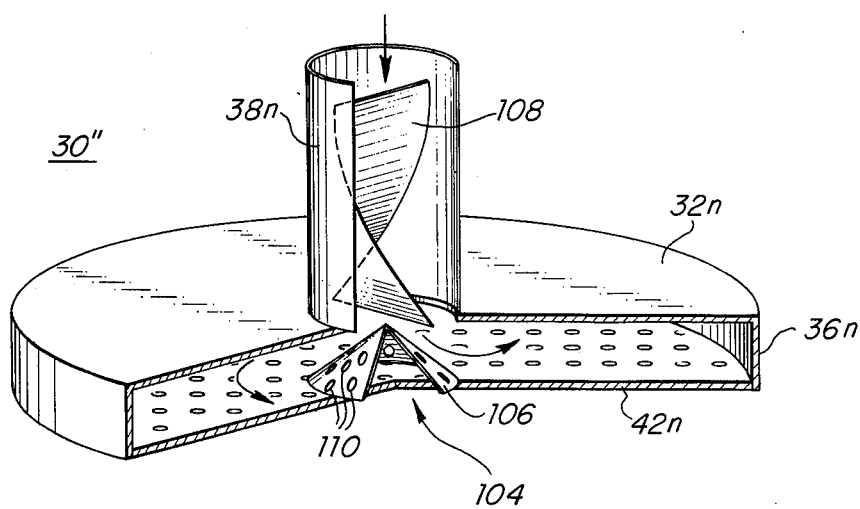
FIG. 10 shows another form of flow diverter according to this invention.

Alternatively, flow distributors 30'', FIG. 10, may be formed by inlet 38n, top 32n, side wall 36n and perforated bottom 42n, similar to those in flow distributors 30 and 30'. Flow diverter 104 includes a first deflection device, omnidirectional surface or cone 106 for redirecting the incoming fluid from inlet 38n into a plane transverse to the primary flow direction, and a second deflection member, helical vane 108, which generates a tangential flow with radial velocity components for producing over the plenum chamber area a pattern of distributed vorticity which finally dissipates the flow velocity. Holes 110, similar to holes 55, FIG. 3, are provided to relieve the vacuum or underpressure which would otherwise be created on the lee side of the surface by the Bernouli effect.

This flow distributor is suitable for relatively smaller devices with only one inlet.

Other embodiments will occur to those skilled in the art and are within the following claims:

What is claimed is:

1. A vortical flow distributor for uniformly, vortically distributing incoming fluid in a plane transverse to the primary flow direction, comprising:
    an outlet and at least one smaller inlet;
    a plenum chamber disposed between said inlet and outlet and having an area corresponding to the area of the outlet and having a length in the primary flow direction which is substantially less than its width; and
    a flow diverter aligned with each said inlet for directing the incoming fluid into a plane transverse to the primary flow direction and for establishing a tangential flow with radial components for producing over the plenum chamber area a pattern of distributed vorticity which finally dissipates the flow velocity.

2. The flow distributor of claim 1 in which each said flow diverter is a first deflector device for directing the incoming fluid into a plane transverse to the primary flow direction and a second deflector device for establishing a tangential flow with radial components.

3. The flow distributor of claim 2 in which said first deflector device includes a first section generally parallel with the plane of said plenum chamber and said second deflector device includes a second section inclined toward its associated said inlet.

4. The flow distributor of claim 3 in which each said flow diverter further includes a support member mounted at the said outlet end of said plenum chamber for mounting said deflector devices.

5. The flow distributor of claim 3 in which each said flow diverter further includes an adjustment mechanism for setting the orientation of said flow diverter.

6. The flow distributor of claim 2 in which said first deflector device includes a plate having a hole proximate the center of said plenum chamber and said second deflector device includes a first pair of curved segments inwardly converging toward said hole, carried by said plate, and facing their associated said inlet, and a second pair of curved segments outwardly diverging from said hole, carried by said plate and facing said outlet.

7. The flow distributor of claim 2 in which said first deflector device includes an omnidirectional surface and said second deflector device includes a helical vane disposed proximate the terminus of said inlet at said plenum outlet.

8. The flow distributor of claim 1 in which said flow diverter includes a single deflector member for directing the incoming fluid into a plane transverse to the primary flow direction and establishing a tangential flow with radial components.

9. A vortical flow distributor for uniformly, vortically distributing incoming fluid in a plane transverse to the primary flow direction, comprising:
    an outlet and at least one smaller inlet;
    a plenum chamber disposed between said inlet and outlet and having an area corresponding to the area of the outlet and having a length in the primary flow direction which is substantially less than its width;
    a flow diverter aligned with each said inlet including a first deflector device for directing the incoming fluid into a plane transverse to the primary flow direction and a second deflector device for establishing a tangential flow with radial components for producing over the plenum chamber area a pattern of distributed vorticity which finally dissipates the flow velocity; said first deflector device including a first section generally parallel with the plane of said plenum chamber and said second deflector device including a second section inclined toward its associated said inlet.

10. The flow distributor of claim 9 in which each said flow diverter further includes a support member mounted at the said outlet end of said plenum chamber for mounting said deflector devices.

11. The flow distributor of claim 10 in which each said flow diverter further includes an adjustment mechanism for setting the orientation of said flow diverter.

12. A vortical flow distributor for uniformly, vortically distributing incoming fluid in a plane transverse to the primary flow direction, comprising:
    an outlet and at least one smaller inlet;
    a plenum chamber disposed between said inlet and outlet and having an area corresponding to the area of the outlet and having a length in the primary flow direction which is substantially less than its width;
    a flow diverter aligned with each said inlet including a first deflector device for directing the incoming fluid into a plane transverse to the primary flow direction and a second deflector device for establishing a tangential flow with radial components for producing over the plenum chamber area a pattern of distributed vorticity which finally dissipates the flow velocity; said first deflector device including a plate having a hole at its inner end proximate the center of said plenum chamber and said second deflector device including a first pair of curved segments inwardly converging toward said hole, carried by said plate, and facing their associated said inlet, and a second pair of curved segments outwardly diverging from said hole, carried by said plate and facing said outlet.

13. A vortical flow distributor for uniformly, vortically distributing incoming fluid in a plane transverse to the primary flow direction, comprising:
- an outlet and at least one smaller inlet;
- a plenum chamber disposed between said inlet and outlet and having an area corresponding to the area of the outlet and having a length in the primary flow direction which is substantially less than its width; and
- a flow diverter aligned with each said inlet including a first deflector device for directing the incoming fluid into a plane transverse to the primary flow direction and a second deflector device for establishing a tangential flow with radial components for producing over the plenum chamber area a pattern of distributed vorticity which finally dissipates the flow velocity; said first deflector device including an omnidirectional surface and said second deflector including a helical vane disposed proximate the terminus of said inlet at said plenum chamber.

* * * * *